(12) United States Patent
Homner et al.

(10) Patent No.: US 8,794,895 B2
(45) Date of Patent: Aug. 5, 2014

(54) DECOMPRESSION SEAL WITH SCREW CONNECTION FOR HOLDING COMPONENTS TOGETHER

(75) Inventors: Bernhard Homner, Calw-Stammheim (DE); Dimitri Svyrsky, Pforzheim (DE)

(73) Assignee: S-Fasteners GmbH, Althengstett (DE)

( * ) Notice: Subject to any disclaimer, the term of this patent is extended or adjusted under 35 U.S.C. 154(b) by 69 days.

(21) Appl. No.: 13/117,885

(22) Filed: May 27, 2011

(65) Prior Publication Data

US 2012/0093610 A1    Apr. 19, 2012

(30) Foreign Application Priority Data

Jul. 22, 2010    (DE) ..................... 20 2010 010 488 U

(51) Int. Cl.
- *F16B 21/07* (2006.01)
- *F16B 5/00* (2006.01)
- *F16B 5/02* (2006.01)
- *F16B 5/06* (2006.01)

(52) U.S. Cl.
CPC ............... *F16B 21/073* (2013.01); *F16B 5/02* (2013.01); *F16B 5/0642* (2013.01)
USPC .......................................... 411/551; 411/549

(58) Field of Classification Search
USPC ......................................... 411/349, 549–553
See application file for complete search history.

(56) References Cited

U.S. PATENT DOCUMENTS

| | | | | |
|---|---|---|---|---|
| 2,200,702 A | * | 5/1940 | Oddie | 411/349 |
| 2,252,286 A | * | 8/1941 | Hathorn | 411/349 |
| 2,416,873 A | * | 3/1947 | Gorfin | 411/551 |
| 2,487,330 A | * | 11/1949 | Green | 411/549 |
| 2,552,779 A | * | 5/1951 | Griffin | 411/551 |

(Continued)

FOREIGN PATENT DOCUMENTS

| | | |
|---|---|---|
| DE | 19708838 A1 | 9/1998 |
| DE | 29920497 U1 | 3/2000 |
| DE | 29920499 U1 | 3/2000 |

(Continued)

OTHER PUBLICATIONS

German Patent and Trademark Office, German Search Report dated Dec. 4, 2011 for German Utility Model Application of Origin 202010010488.2, F/D Jul. 22, 2011, Munich, Germany.

(Continued)

*Primary Examiner* — Flemming Saether
(74) *Attorney, Agent, or Firm* — Woodling, Krost and Rust

(57) ABSTRACT

Decompression seal (1) for connecting components (3, 4, 5) having openings (2) which opens on excessive pressure. It consists of a retaining-bolt-like arrangement (6) with a bolt head (7) and a locking head (8) with recesses (8-1, 8-2) into which, in the retaining position, the ends of leaf-spring arms (9-3, 9-2) engage. These recesses (8-1, 8-2) and the leaf-spring arms are formed in such a way that when a certain pressure accumulates on the side of the upper component (5) the retaining position is released and the retaining-bolt-like arrangement (6) is pushed axially (17) in direction (R) towards the bolt head (7). Through the threaded connection of the shafts (11, 12) this decompression seal (1) allows the components (3, 4, 5) to be drawn together by turning the bolt head (7). A rotation lock (15, 16) prevents the connection from working loose.

4 Claims, 9 Drawing Sheets

(56) References Cited

U.S. PATENT DOCUMENTS

| | | | |
|---|---|---|---|
| 3,718,950 A * | 3/1973 | Engstrom | 411/347 |
| 3,893,211 A * | 7/1975 | Skinner | 411/349 |
| 3,988,808 A | 11/1976 | Poe et al. | |
| 5,782,511 A | 7/1998 | Schwarz | |
| 6,409,446 B1 * | 6/2002 | Schwarz | 411/552 |
| 7,533,911 B2 | 5/2009 | Homner | |
| 2011/0041293 A1 | 2/2011 | Langediers et al. | |

FOREIGN PATENT DOCUMENTS

| | | |
|---|---|---|
| DE | 102009038644 A1 | 3/2011 |
| EP | 0894933 A2 | 2/2011 |

OTHER PUBLICATIONS

European Patent Office, European Search Report dated Oct. 17, 2011 for European Patent Application EP 11003865.8-2424, claiming priority to 202010010488.2, Munich, Germany.

* cited by examiner

DECOMPRESSION SEAL WITH SCREW CONNECTION FOR HOLDING COMPONENTS TOGETHER

SUMMARY OF THE INVENTION

The purpose of decompression seals is to open under excessive pressure, thereby releasing components, such as plates, from a retaining position. The decompression seal normally opens by overcoming the retaining force of a spring.

The European patent application no. EP 0 894 933 A2 describes a decompression seal with the following characteristics: A bar is mounted rotatably on bearings on a slide which is movable in a lengthwise direction. A catch spring holds the bar in the closed position and releases it when a predetermined overpressure is reached.

The purpose of the invention is to provide a new type of decompression seal. The invention aims to provide a decompression seal which permits components to be held together by a screwed connection.

One particular version of the invention is shown in the drawings and is described in detail below.

DESCRIPTION OF THE INVENTION

Figure 1:
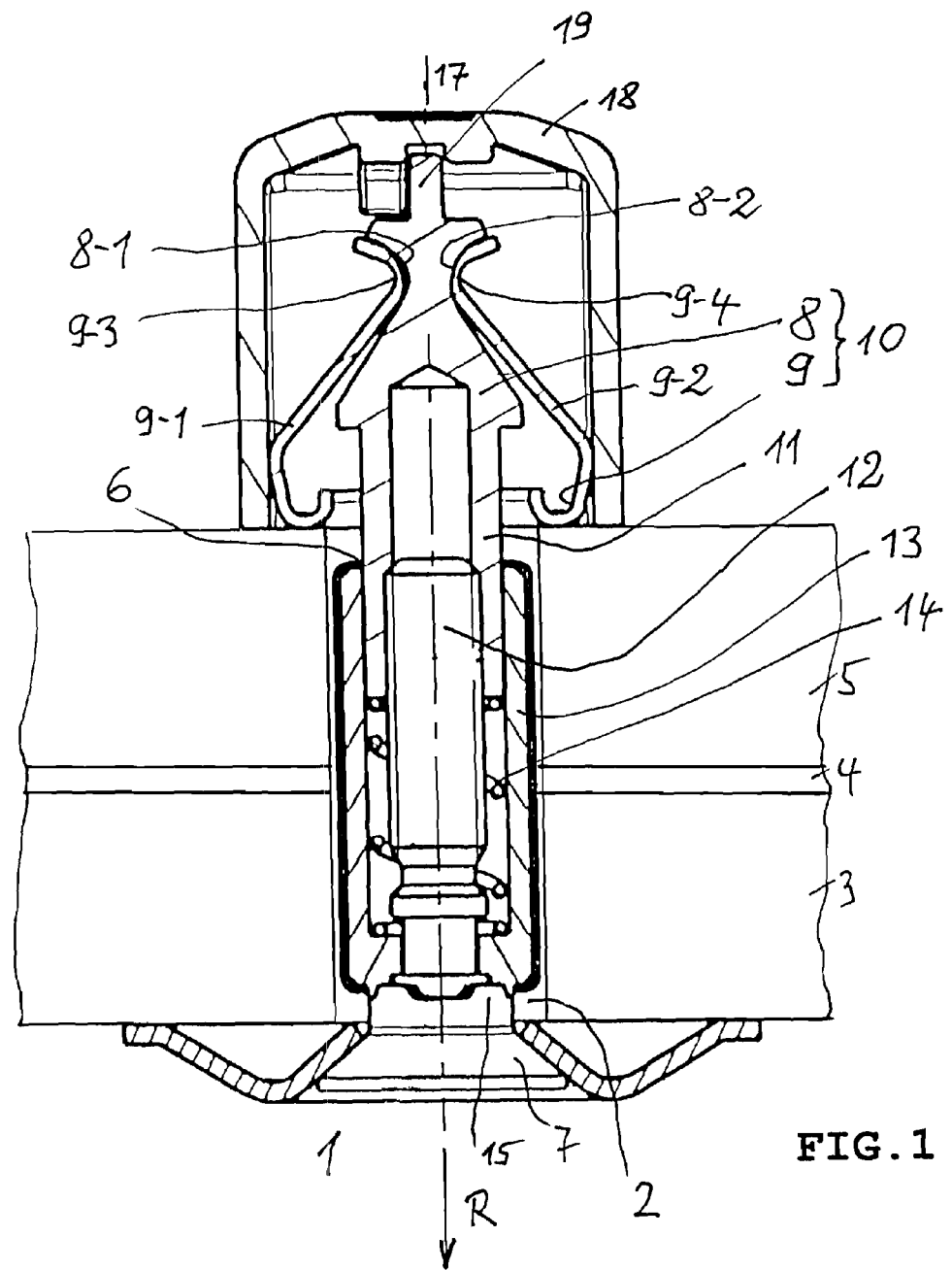
FIG. 1 shows a sectional view of the decompression seal according to the invention in the retaining position.

FIG. 1 shows a sectional view of the decompression seal 1 according to the invention in the retaining (locking) position. The decompression seal 1 serves to join components 3, 4, and 5 together which have openings 2 aligned with one another. It opens when a certain previously defined pressure on the side of the upper component 5 is exceeded. The decompression seal 1 comprises a retaining-bolt-like arrangement 6 with a bolt head 7 and a releasable locking arrangement 10 (FIG. 2A, FIG. 2B) consisting of two components 8, 9. The retaining-bolt-like arrangement 6 can be pushed through the openings 2 in the components 3, 4 and 5 until its bolt head 7 lies against the lower component 3. The end of the retaining-bolt-like arrangement 6 projecting from the upper component 5 is formed as the first component 8 of the locking arrangement 10. In the version of the invention shown as an example, it is marked as locking head 8. The locking arrangement 10 is joined to the upper component 5. The components 3, 4, and 5 are arranged between the bolt head 7 and the locking arrangement 10.

The locking head 8 of the retaining-bolt-like arrangement 6 has two diametrically positioned recesses 8-1, 8-2 for the engagement of the spring-loaded retaining elements of the second component 9 of the locking arrangement.

In the version of the invention shown as an example, the second component 9 of the locking arrangement is retaining leaf-spring arrangement 9. Its base part 9-5 (FIG. 6) has an opening through which the upper part of the retaining-bolt-like arrangement 6 with the locking head 8 can pass. Two leaf-spring arms 9-1, 9-2 located opposite one another extend diagonally upwards and inwards from the edge of the base part 9-5, whose free ends 9-3, 9-4 are rounded and curve outwards. They are located at a short distance from one another.

Figure 11:
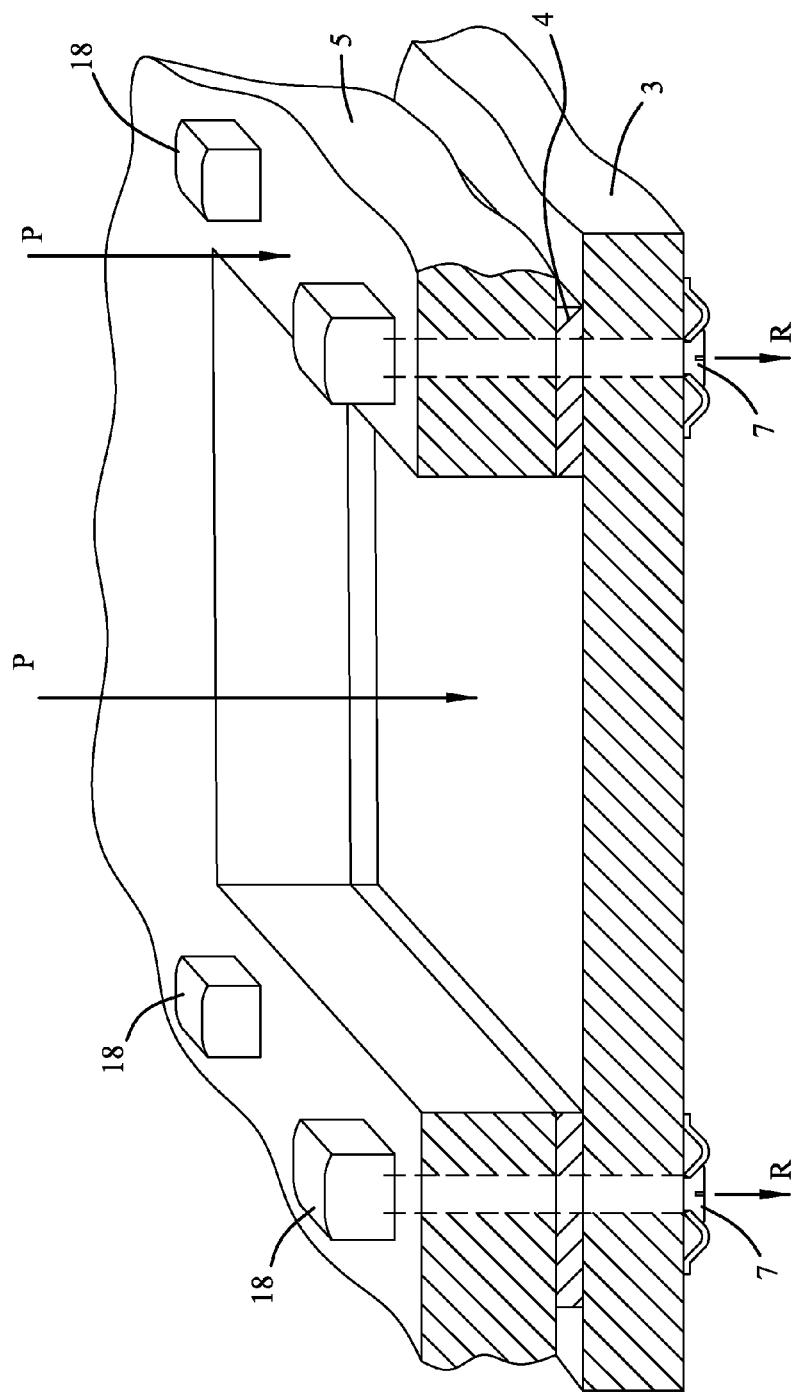
FIG. 11 illustrates the subject matter of FIG. 1 in a broader perspective.

FIG. 11 illustrates the subject matter of FIG. 1 in a broader perspective. The decompression seal includes the components 3, 4, 5 illustrated in FIG. 11. Pressure, P, applied to components 3 and 5, causes separation of the components 3 and 5.

In the retaining position (locking position) of the decompression seal, the ends of the leaf-spring arms 9-3, 9-4 engage in the recesses 8-1, 8-2 of the locking head. The recesses 8-1, 8-2 and the arms of the leaf spring 9-3, 9-4 are formed in such a way that when a certain pre-defined pressure is reached on the side of the upper component 5, the retaining-bolt-like arrangement 6 is pushed axially 17 in the direction R of the bolt head 7, thereby releasing the retaining position and pressing the ends of the leaf-spring arms 9-3, 9-4 out of the recesses 8-1, 8-2.

The first component of the locking arrangement and the spring-loaded retaining elements may be formed differently to the arrangement shown in the example.

For example, the first component of the locking arrangement may be a locking head with only one (e.g. a ring-shaped) recess or with more than two recesses for engaging correspondingly shaped spring-loaded retaining elements. For example, the retaining elements may also be formed by spring-loaded retaining pins.

The retaining-bolt-like arrangement 6 comprises the shaft 12 with the bolt head 7 and the shaft 11 with the locking head 8. The two shafts 12, 11 can be connected by means of a thread. The shaft 12 joined to the bolt head 7 has an outer thread and the shaft 11 joined to the locking head 8 has an inner thread. The connection can be screwed together or released by turning the bolt head 7.

Figure 5:
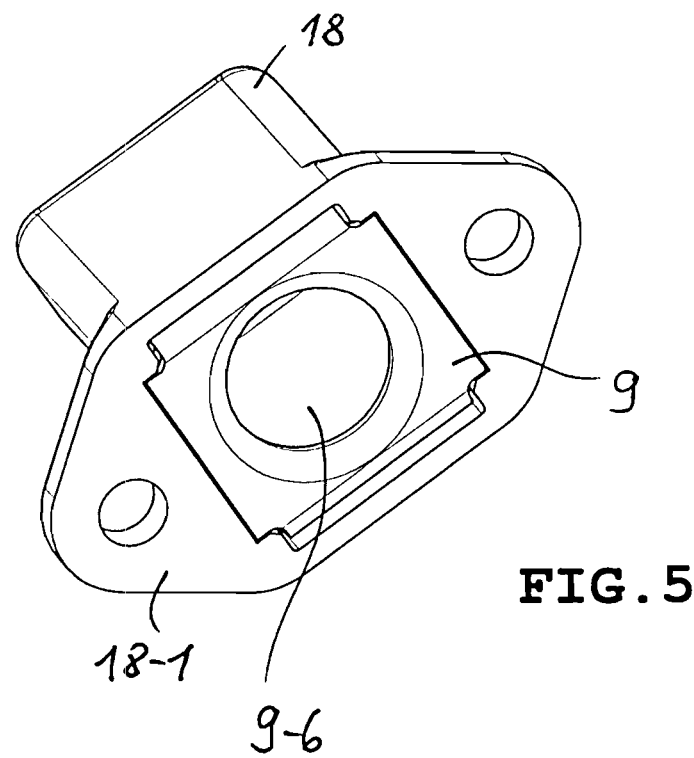
FIG. 5 shows an isometric diagram of a housing encompassing the retaining leaf-spring arrangement with viewing direction towards the lower side of the housing.

The retaining leaf-spring arrangement 9 is located in a housing 18 torque-proof with reference to the imaginary axis 17 of the retaining-bolt-like arrangement 6. The housing 18 is permanently attached to the upper component 5, e.g. by bolting (FIG. 5).

Figure 2A:
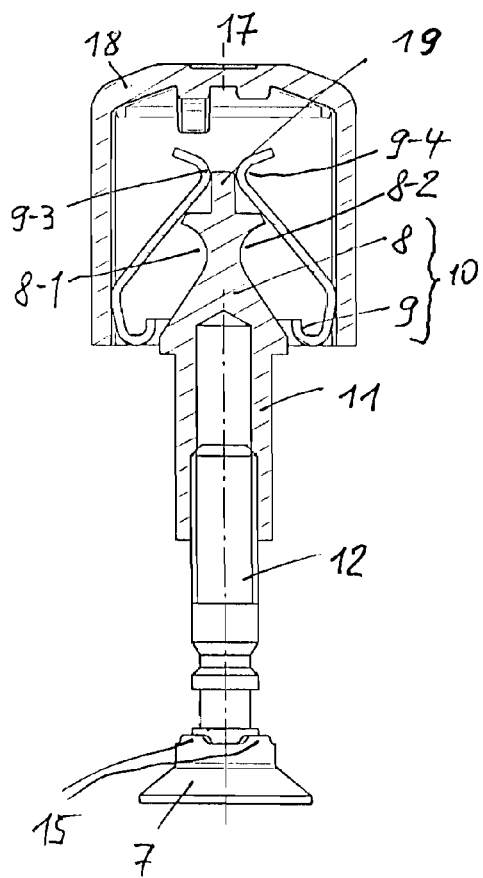
FIG. 2A shows a sectional view of the decompression seal (without sleeve with spiral spring) in a position in which the retaining-bolt-like arrangement is not yet fully inserted into the retaining-spring arrangement.

FIG. 2A shows a sectional view of the decompression seal 1 (without sleeve with spiral spring) in a position in which the retaining-bolt-like arrangement 6 is not yet fully inserted into the retaining-spring arrangement 9.

Figure 2B:
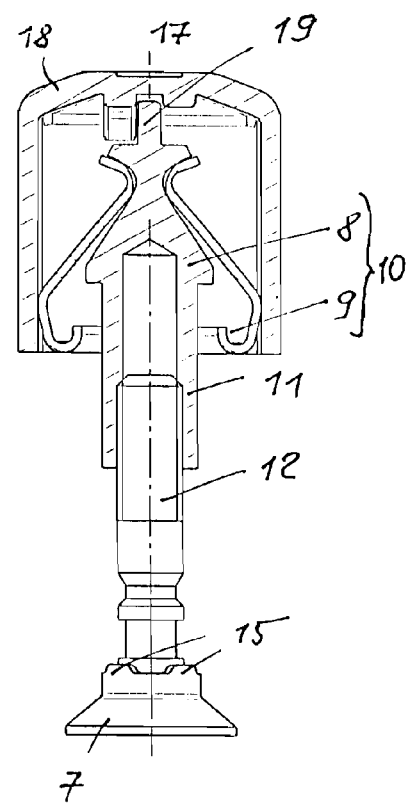
FIG. 2B shows a sectional view of the decompression seal (without sleeve with spiral spring) in a position in which the retaining-bolt-like arrangement is fully inserted into the retaining-spring arrangement.

FIG. 2B shows a sectional view of the decompression seal (without sleeve with spiral spring) in a position in which the retaining-bolt-like arrangement 6 is fully inserted into the retaining-spring arrangement 9.

A tappet 19 is arranged on the locking head 8 of the retaining-bolt-like arrangement 6. When the retaining-bolt-like arrangement 6 is pressed into the retaining-spring arrangement 9, the tappet 19 first enters the area between the two ends of the leaf-spring arms 9-3, 9-4 which are a certain distance apart.

The tappet 19 is shaped in such a way that it (and consequently the locking head 8 also) is aligned or is turned into a certain position with reference to the axis 17 when passing between the ends of the leaf-spring arms 9-3, 9-4. In this position, the ends of the leaf-spring arms 9-3, 9-4 press against the broad sides (FIG. 7B) of the tappet 19.

When the retaining-bolt-like arrangement 6 is pressed further into the retaining leaf-spring arrangement 9, the ends 9-3, 9-4 of the two leaf-spring arms engage the recesses 8-1, 8-2 of the locking head 8 (retaining position).

Figure 9A:
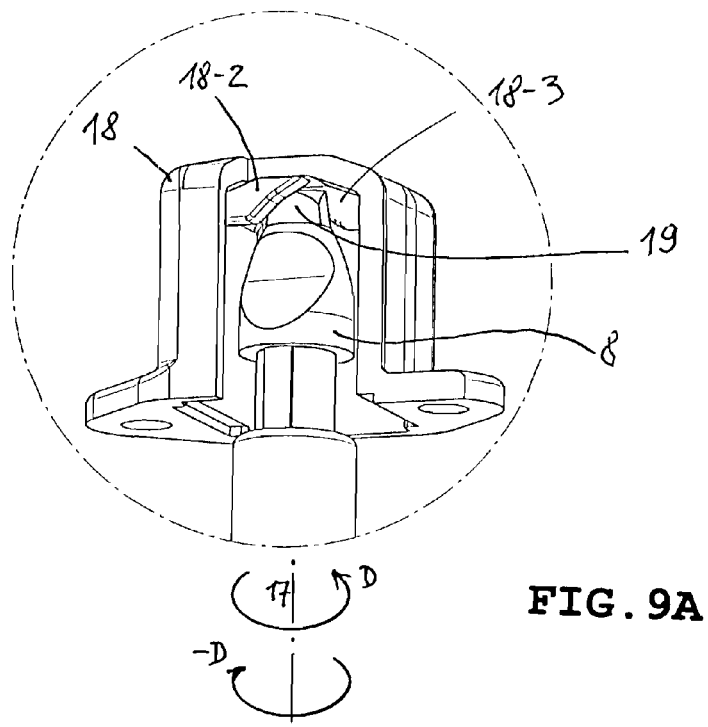
FIG. 9A shows an isometric view of the housing opened to show the locking head with its tappet in a stopped position for retaining (the retaining leaf-spring arrangement is not shown).

In this retaining position, the tappet 19 assumes a certain position in the tappet-seat arrangement 18-2/18-3 on the top of the housing (FIG. 9A). In this position, depending on the direction of rotation of the bolt head 7, the tappet or the locking head are prevented from turning by a stop, or are permitted to turn only to a certain angle.

When the threaded connection of the shafts 11, 12 is tightened by turning the bolt head 7 in direction D (FIG. 9A), it is not possible to turn the locking head 8 as will be explained below.

When the retaining position is intentionally manually released (not to be confused with the self-activated opening of the decompression seal under excessive pressure), the bolt head 7 is turned in direction −D. In this case, the locking head 8 should turn by a certain amount (in the example of the invention quoted, approximately 90 degrees) in direction −D. Following such a turn, the ends of the leaf-spring arms no longer engage the recesses 8-1 and 8-2. Further details are given with reference to FIGS. 9A and 9B.

Figure 3:
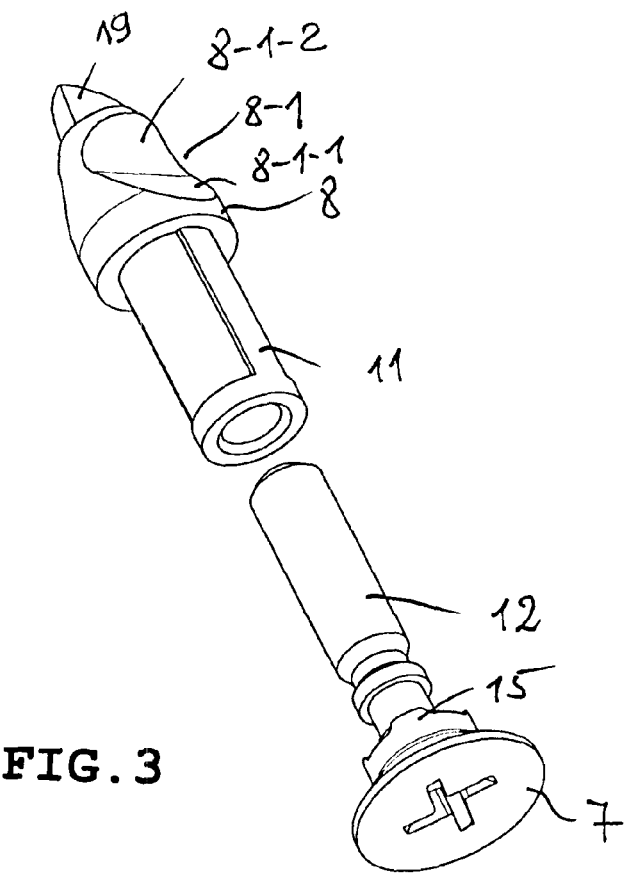
FIG. 3 shows an isometric diagram of the two-part retaining bolt (without sleeve with spiral spring) consisting of a shaft with exterior thread and bolt head and of a shaft with interior thread with locking head.

FIG. 3 shows an isometric diagram of the two-part retaining bolt (without sleeve with spiral spring) consisting of the shaft 12 with exterior thread and bolt head 7 and of the shaft 11 with interior thread with locking head 8. The two shafts 11, 12 can be screwed together by turning the bolt head 7.

The recesses 8-1 and 8-2 (in FIG. 3 concealed) have bevels running in axial direction. The upper bevel 8-1-2 of the recess 8-1 enables the end of the retaining leaf-spring arm to slide more easily into and out of the recess. The lower bevel is provided to adapt the shape to that of the arm of the retaining leaf-spring.

The details on the sleeve surrounding shafts 11, 12 and on the rotation lock for the threaded connection of both shafts 11, 12 will be explained with reference to the FIGS. 4A, 4B, 4C and 4D.

Figure 4B:
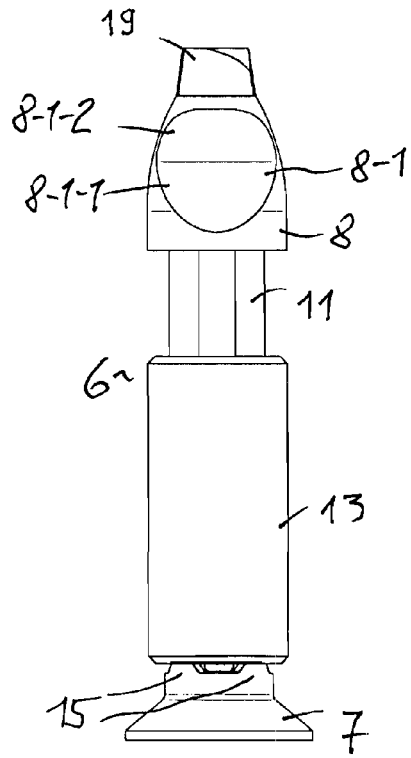
FIG. 4B shows a side view of the retaining-bolt-like arrangement.
Figure 4C:
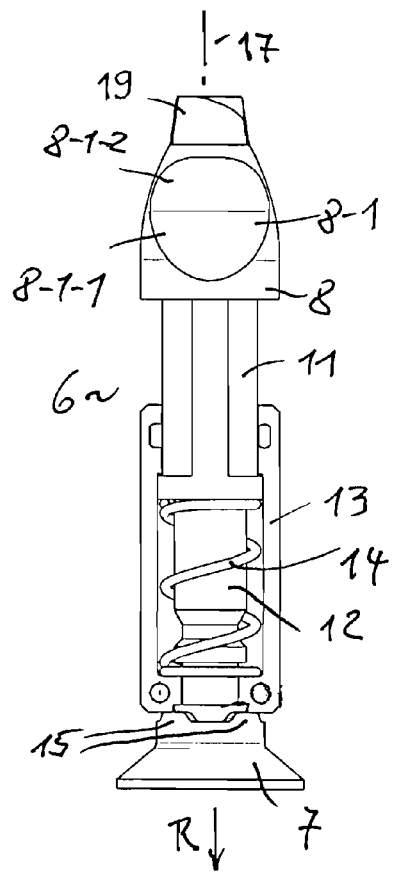
FIG. 4C shows a view of the retaining-bolt-like arrangement showing the connection between the outer and the inner-threaded shaft.
Figure 4A:
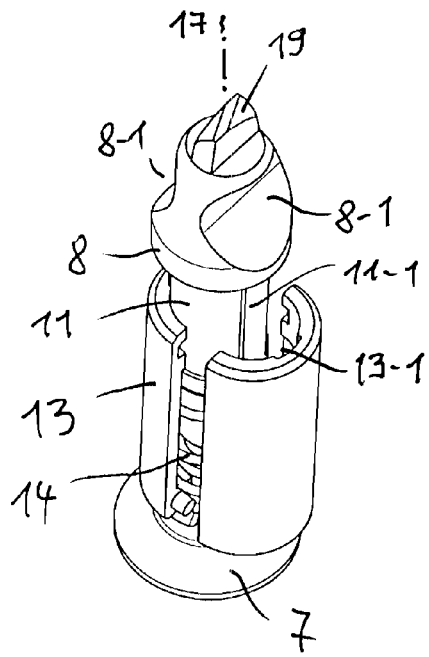
FIG. 4A shows an isometric diagram of the retaining-bolt-like arrangement with the sleeve split into two parts.

FIG. 4A shows an isometric diagram of the retaining-bolt-like arrangement 6 with the sleeve split into two parts.

FIG. 4B shows a side view of the retaining-bolt-like arrangement 6.

FIG. 4C shows a view of the retaining-bolt-like arrangement showing the connection between the outer and the inner threaded shaft.

Figure 4D:
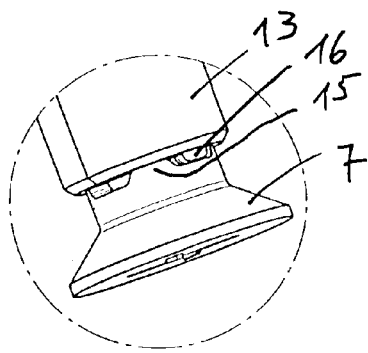
FIG. 4D shows an isometric partial view of the rotation lock.

FIG. 4D shows an isometric partial view of the rotation lock 15/16.

The sleeve (13) embraces the two shafts 11 and 12. The rotatable shaft 11 is guided in a groove (11-1/13-1) in the sleeve 13 in such a way that the sleeve (13) can move only in the direction of the axis 17.

In the sleeve 13 (see also FIG. 4C), a spiral pressure spring 14 is arranged in such a way that the lower edge of the sleeve is pressed in direction R against the inner edge of the bolt head 7. As explained below, the lower edge of the sleeve and the inner edge of the bolt head are formed as a rotation lock for the threaded connection of the shafts 11, 12.

On the lower edge of the sleeve (13) and the inner edge of the bolt head 7, engaging elements 16, 15 are arranged concentrically at a distance from one another. In the engaged position, an engaging element 16 or 15 fits into the space between two opposing engaging elements 15 and 16 (FIG. 4D). When the bolt head 7 is turned, the bevelled surfaces of the engaging elements 15 on the inner edge of the bolt head 7 press against the bevelled surfaces of the engaging elements 16 on the underside of the sleeve in such a way that the sleeve 13 is pressed temporarily out of the engaged position against the force of the spiral pressure spring 14. On completion of the turning operation, the engaging elements 16 on the lower edge of the sleeve and those (15) on the inner edge of the bolt head 7 assume a new spring-loaded (14) engaged position.

The spiral pressure spring 14 (FIG. 4C) arranged in the sleeve rests on the end of the shaft 11 and presses against the inner shoulder of the sleeve. The lower edge of the sleeve is thus pressed in direction R onto the inner edge of the bolt head 7. The engaging elements 15, 16 are retained in the engaged position by the pressure of the spring.

The engaging elements 16 arranged concentrically at a distance from one another on the lower side of the sleeve 13 engage with the force of the spring (14) in the spaces between the engaging elements 15 arranged concentrically at a distance from one another on the inner edge of the bolt head 7. At the same time, the engaging elements 15 on the inner edge of the bolt head 7 also engage in the spaces between the engaging elements 16 on the lower side of the sleeve 13.

FIG. 5 shows an isometric diagram of a housing encompassing the retaining-spring arrangement 9 with viewing direction towards the lower side 18-1 of the housing 18.

Figure 6:
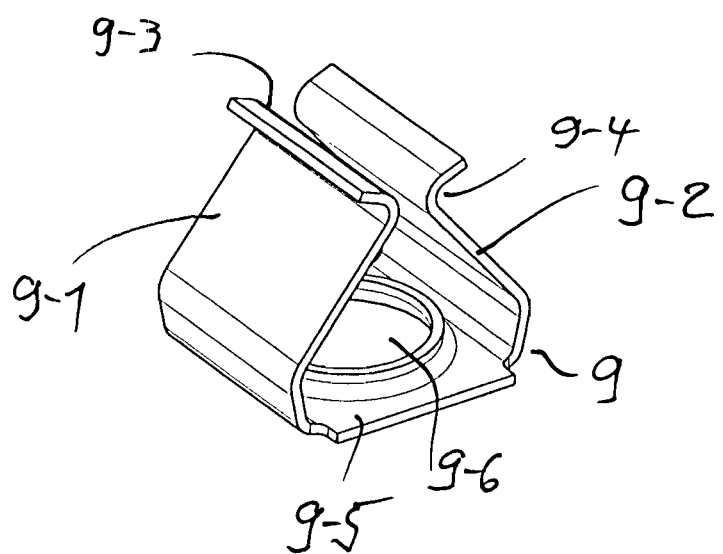
FIG. 6 shows an isometric diagram of the retaining leaf-spring arrangement.

FIG. 6 shows an isometric diagram of the retaining leaf-spring arrangement 9. The retaining leaf-spring arrangement has a base part 9-5 with an opening 9-6 through which the upper part of the retaining-bolt-like arrangement 6 with the locking head 8 is pushed. From the edge of the base part 9-5 two leaf-spring arms 9-1, 9-2 located opposite one another extend diagonally upwards and inwards, whose free ends 9-3, 9-4 are rounded and curve outwards. These free ends are positioned a short distance apart opposite one another. In the retaining position, these leaf-spring arms 9-3, 9-4 engage into the recesses 8-1, 8-2 arranged diametrically on the locking head.

The base part 9-5 of the retaining leaf-spring arrangement (9) is angular in shape. It (9-5) fits positively into a corresponding recess in the housing in such a way that the retaining leaf-spring arrangement (9) is located in the housing 18 torque-proof with reference to the axis 17. The housing is fixed permanently to the upper component 5, e.g. by screwing or riveting (not shown).

Figure 7A:
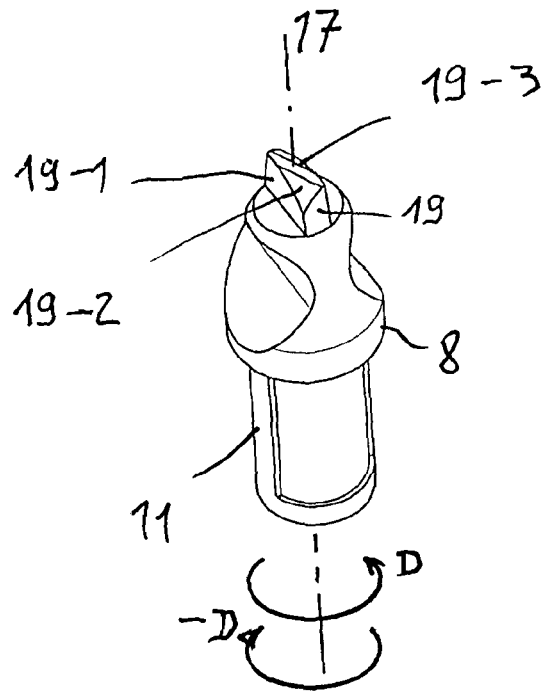
FIG. 7A shows an isometric diagram of the locking head with tappet.

FIG. 7A shows an isometric diagram of the locking head 8 with tappet 19. The shaft 11 of the locking head 8 and the tappet 19 can rotate around the axis 17 of the retaining-bolt-like arrangement 6.

The tappet 19 is cube-like in shape. It is arranged on the locking head 8 in such a way that its imaginary centre line coincides with the axis 17 of the retaining-bolt-like arrangement. This centre line is so defined that it is at an equal distance from the edges of the cube in an imaginary sectional view of the tappet vertical to the axis 17.

At its free end, the tappet 19 is bevelled according to FIG. 7A in two diametrically positioned corner areas 19-2 and 19-3. The front broad side 19-1 of the tappet 19 has an upper left-hand corner 19s and an upper right-hand bevelled area 19m in place of the corner.

Figure 7B:
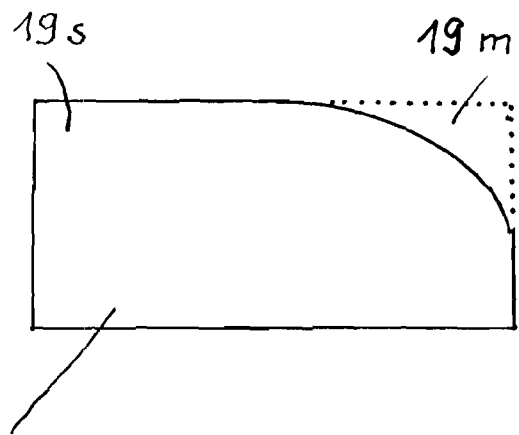
FIG. 7B shows a top view of the broad side of the tappet.

Similarly to the broad side 19-1, the rear broad side (not shown in FIG. 7A), marked (19-4) in FIG. 7B, has an upper left-hand corner 19s and an upper right-hand bevelled area 19m in place of the corner. These areas 19s and 19m fulfil different functions depending on whether the locking head 8 is turned in direction D or direction −D.

FIG. 7B shows a top view of the broad side 19-1 (or 19-4) of the tappet 19. The front broad side has an upper left-hand corner 19s and an upper right-hand bevelled area 19m in place of the corner. The upper left-hand corner 19s and the upper right-hand bevelled area 19m play an important part in limiting the rotation of the tappet 19 after this has been inserted into the tappet-seat arrangement 18-2 and 18-3 of the housing 18.

Starting at the retaining position, two different possible turning movements of the bolt head should be distinguished (FIG. 7A): a turning movement in direction D (corresponding to the rotation of the bolt head to tighten the threaded connection of shafts 11 and 12) and a turning movement in direction −D to release the retaining position for assembly purposes.

Figure 8A:
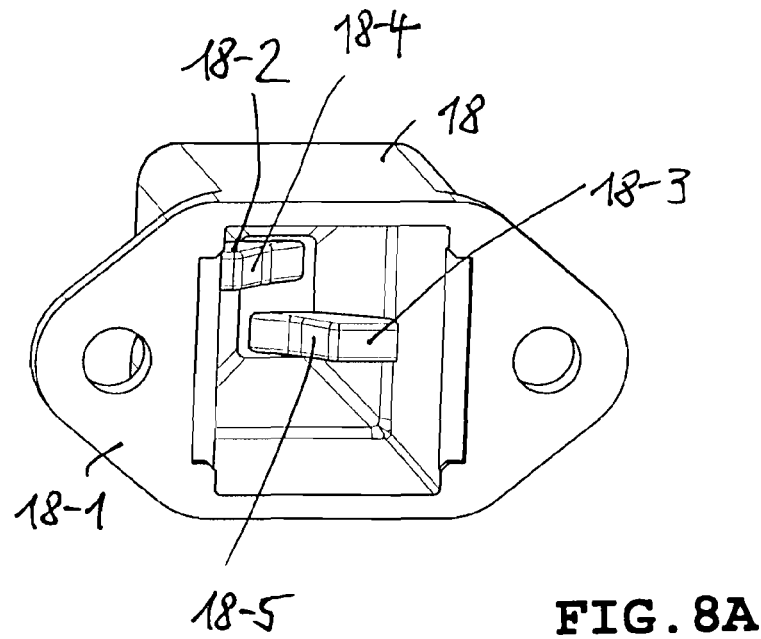
FIG. 8A shows an isometric view of the housing according to FIG. 5 (without the retaining leaf-spring arrangement inserted) seen towards the tappet-seat arrangement on the roof of the housing.

FIG. 8A shows an isometric view of the housing 18 according to FIG. 5 (without the retaining leaf-spring arrangement inserted) seen towards the tappet-seat arrangement 18-2, 18-3 on the roof of the housing.

Figure 8B:
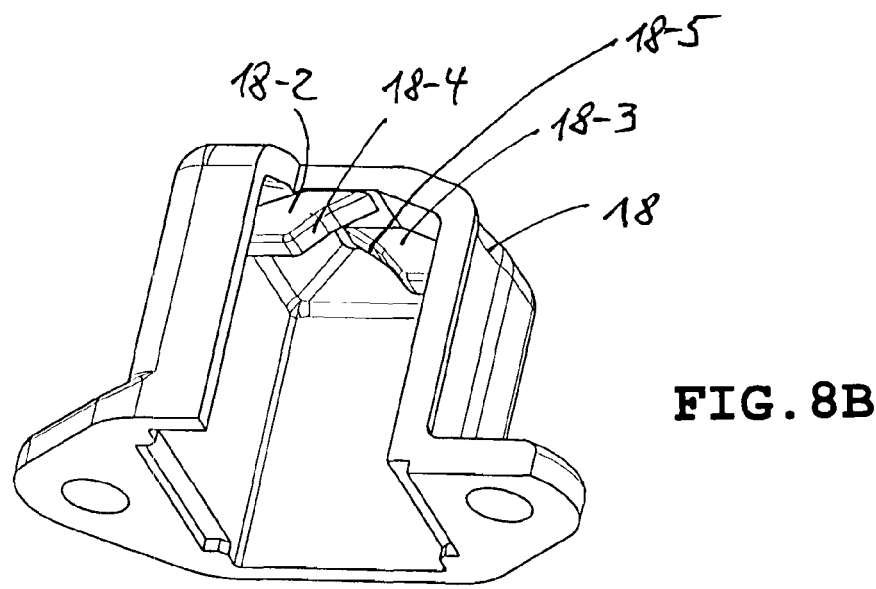
FIG. 8B shows an isometric view of the housing according to FIG. 8A opened to show the tappet-seat arrangement.

FIG. 8B shows an isometric view of the housing 18 opened according to FIG. 8A opened to show the tappet-seat arrangement 18-2, 18-3 from a different direction.

The tappet-seat arrangement comprises two wall elements 18-2, 18-3 offset in relation to one another. The planes of the inner sides of these wall elements facing one another are at a distance from one another which permits the arrangement of the tappet of thickness d (=distance between their broad sides) between these planes.

FIG. 9A shows an isometric view of the housing 18 opened to show the locking head 8 with its tappet 19 in the stopped retaining position (the retaining-spring arrangement is not shown).

Figure 9B:
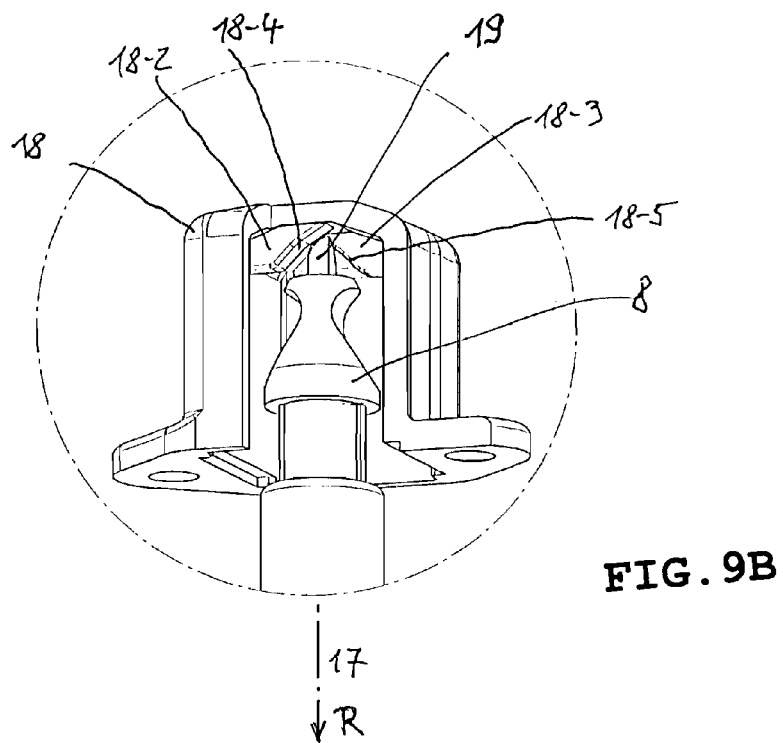
FIG. 9B shows an isometric view of the housing opened to show the locking head with its tappet in a different stopped position to that shown in FIG. 9A. This different stopped position refers to a turned position of the locking head in which it is no longer in the retaining position.

FIG. 9B shows an isometric view of the housing 18 opened to show the locking head 8 with its tappet 19 in a different rotation position to that shown in FIG. 9A. In this different position the locking head 8 is no longer in the retaining position (in which the ends of the leaf-spring arms engage the recesses).

In the tappet-seat arrangement, it is not possible to turn the tappet 19 in direction D (in this direction, the bolt head 7 tightens the threaded connection between the shafts 11 and 12) because the upper left-hand corner area 19s of the broad side 19-1 (19-4) of the tappet strikes against the inside of the wall elements 18-2 (18-3). (FIG. 9A).

It is possible to turn the tappet 19 in direction −D (in this direction, the bolt head 7 releases the threaded connection between the shafts 11 and 12) by a certain angle because in the area of the bevelled corners 19-2, 19-3, the tappet can still be turned a certain distance beneath the bevelled surface 18-4 (18-5) of the wall element 18-2 (18-3) until the tappet encounters the bevels, and on continued rotation in direction −D, slides along these bevels, thereby causing the retaining-bolt-like arrangement 6 connected to the tappet 19 to be deflected in direction R.

The angle of rotation depends on the dimensions of the bevelled corner area and the shape of the bevel. In the example of the invention quoted, it is approximately 90 degrees.

Following a rotation of 90 degrees, the ends of the arms of the retaining leaf spring no longer engage the recesses 8-1, 8-2 because these recesses are diametrically arranged. They lie against the smooth surface of the conical locking head 8 (this tapers towards the tappet) and exert a force on it. A component of the force acts in direction R in such a way that the locking head and consequently the retaining-bolt-like arrangement 6 is pushed in direction R out of the opening 2. This facilitates the removal of the retaining-bolt-like arrangement 6.

Figure 10:
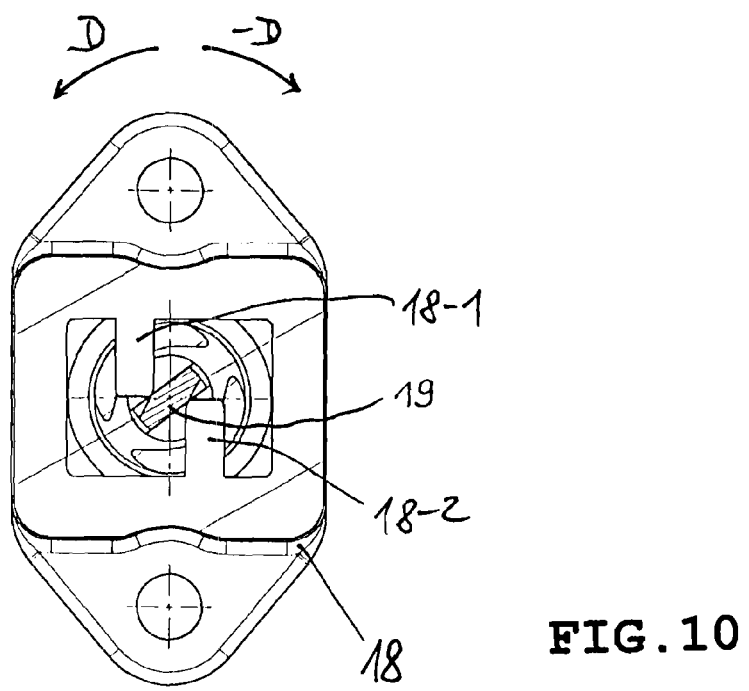
FIG. 10 shows a sectional view of the housing with the tappet in a turned position between two wall elements in the tappet-seat arrangement.

FIG. 10 shows a sectional view of the housing 18 with the tappet 19 rotated into a position between the two wall elements 18-1 and 18-2 in the tappet-seat arrangement. In this view it can be seen that the tappet can only rotate so far in direction D until the upper corner areas 19s of the broad side of the tappet strike the wall element 18-1 or 18-2.

When turned in direction −D however, the tappet can still be turned by a certain angle because the lack of a corner area 19-2, 19-3 allows it to be turned a certain distance beneath the bevels 18-4, 18-5 of the wall elements 18-2, 18-3 (FIGS. 8A, 8B, 9B).

The invention claimed is:
1. Decompression seal (1) for connecting components (3, 4, 5) having openings (2) aligned with one another, which opens when a certain previously defined pressure is exceeded, comprising:
   a retaining bolt arrangement (6);
   a bolt head (7) integral with a shaft (12);
   said retaining bolt arrangement (6) being aligned axially with said bolt head (7) and said shaft (12);
   a releasable locking arrangement (10), said releasable locking arrangement includes a locking head (8) and a leaf spring (9);
   said openings (2) in said connecting components (3, 4, 5) having a first diameter, said locking head (8) having a second diameter, said first diameter of said openings (2) in said connecting components (3, 4, 5) being larger than said second diameter of said locking head (8);
   said retaining bolt arrangement (6) resides partially within said openings (2) in said lower connecting component (3), said middle connecting component (4) and said upper connecting component (5), said bolt head (7) engages said lower component (3);

said retaining bolt arrangement (6) projects from said upper connecting component (5), said retaining bolt arrangement (6) interconnected with said locking head (8) of said releasable locking arrangement;

said leaf spring (9) of said releasable locking arrangement (10) connected with said upper component (5);

said lower connecting component (3), said middle connecting component (4) and said upper connecting component (5) reside between said bolt head (7) and said locking arrangement (10);

said locking head (8) of said releasable locking arrangement (10) projects from said upper component (5) and includes a first recess (8-1) and a second recess (8-2);

said leaf spring (9) includes a spring-loaded first end portion (9-3) and a spring-loaded second end portion (9-4);

said first recess (8-1) of said locking head engages said spring-loaded first end portion (9-3) of said leaf spring of said locking arrangement (10) and said second recess (8-2) of said locking head engages said spring-loaded second end portion (9-4) of said leaf spring of said locking arrangement (10), said engagement of said locking head (8) and said leaf spring (9) defines a retaining position;

said retaining bolt arrangement (6) is pushed axially in direction (R) of said bolt head (7) releasing said locking head (8) from said leaf spring (9) and from said retaining position, and said bolt head 8 enters said openings 2;

said retaining bolt arrangement includes a shaft (11) integral with said locking head (8); and, said retaining bolt arrangement (6) includes a sleeve (13) encompassing said shafts (11, 12), said shaft (11) includes an exterior ridge (11-1), said sleeve (13) includes an inner groove (13-1), said ridge of said shaft (11) interfits said groove (13-1) of said sleeve, and, said shaft (11) being axially movable in direction R.

2. Decompression seal (1) for connecting components (3, 4, 5) having openings (2) aligned with one another, which opens when a certain previously defined pressure is exceeded, as claimed in claim 1, further comprising:

a spiral pressure spring (14) resides in said sleeve (13);

said spiral pressure spring (14) operable between said sleeve and said shaft (11);

said bolt head (7) includes an inner edge (15);

said inner edge (15) includes raised protrusions;

said sleeve includes a lower edge (16);

said lower edge (16) includes protrusions;

said lower edge (16) of said sleeve engages said inner edge (15) of said bolt head (7);

said engagement of said lower edge (16) of said sleeve and said inner edge (15) of said bolt head (7) form a rotation lock to protect said threaded connection of said shafts (11, 12) against rotation.

3. Decompression seal (1) for connecting components (3, 4, 5) having openings (2) aligned with one another, which opens when a certain previously defined pressure is exceeded, as claimed in claim 2, further comprising:

said inner edge (15) of said bolt and said lower edge (16) of said sleeve are concentric;

said raised protrusions of said inner edge (15) are circumferentially spaced with spaces between said raised protrusions;

said protrusions of said lower edge (16) are circumferentially spaced with spaces between said protrusions;

when said sleeve and said bolt are interengaged and locked, said raised protrusions of said inner edge (15) of said bolt reside in said spaces between said protrusions of said lower edge (16) and said protrusions of said lower edge (16) reside in said spaces between said raised protrusions of said inner edge (15);

when said bolt head (7) is rotated, said raised protrusions of said inner edge (15) of said bolt head (7) exert pressure on said protrusions of said lower edge (16) of said sleeve (13) pressing said sleeve (13) out of engagement with said bolt (7) against said force of said spiral spring (14) until, on completion of said rotation of said bolt head (7), said protrusions on said lower edges (16) of said sleeve and said raised protrusions of said edges (15) of said bolt head (7) assume a new spring loaded engaged position.

4. Decompression seal (1) for connecting components (3, 4, 5) having openings (2) aligned with one another, which opens when a certain previously defined pressure is exceeded, comprising:

a retaining bolt arrangement (6);

a bolt head (7) integral with a shaft (12);

said retaining bolt arrangement (6) being aligned axially with said bolt head (7) and said shaft (12);

a releasable locking arrangement (10), said releasable locking arrangement includes a locking head (8) and a leaf spring (9);

said openings (2) in said connecting components (3, 4, 5) having a first diameter, said locking head (8) having a second diameter, said first diameter of said openings (2) in said connecting components (3, 4, 5) being larger than said second diameter of said locking head (8);

said retaining bolt arrangement (6) resides partially within said openings (2) in said lower connecting component (3), said middle connecting component (4) and said upper connecting component (5), said bolt head (7) engages said lower component (3);

said retaining bolt arrangement (6) projects from said upper connecting component (5), said retaining bolt arrangement (6) interconnected with said locking head (8) of said releasable locking arrangement;

said leaf spring (9) of said releasable locking arrangement (10) connected with said upper component (5);

said lower connecting component (3), said middle connecting component (4) and said upper connecting component (5) reside between said bolt head (7) and said locking arrangement (10);

said locking head (8) of said releasable locking arrangement (10) projects from said upper component (5) and includes a first recess (8-1) and a second recess (8-2);

said leaf spring includes a rounded and curved outward spring-loaded first end (9-3) and a rounded and curved outward spring-loaded second end (9-4);

said first recess (8-1) of said locking head engages said spring-loaded first end portion (9-3) of said leaf spring of said locking arrangement (10) and said second recess (8-2) of said locking head engages said spring-loaded second end portion (9-4) of said leaf spring of said locking arrangement (10), said engagement of said locking head (8) and said leaf spring (9) defines a retaining position;

said leaf spring (9) includes a base part (9-5), said base part includes an opening (9-6), and said retaining bolt arrangement (6) resides partially within said opening (9-6) of said base part;

said leaf spring includes a first arm (9-1) and a second arm (9-2) located opposite one another, said first arm (9-1) and said second arm (9-2) extend diagonally upwards and inwards from said base part (9-5); and, said locking head (8) of said releasable locking arrangement includes a tappet (19); said tappet (19) is cube shaped and resides on said locking head (8);

said tappet (19) includes a center line coinciding with said axis (17);

said tappet (19) is beveled on one end thereof and in two diametrically positioned corner areas (19-2, 19-3);

said tappet includes broad sides (19-1, 19-4), each broad side includes an upper area (19*s*) having a corner and an upper area (19*m*) having a bevel surface;

a housing;

a tappet-receiving arrangement in said housing (18) comprises two wall elements (18-2, 18-3) offset in relation to one another with edge bevels (18-4, 18-5);

said wall elements include planes and inner sides;

between said planes of said inner sides of said wall elements facing one another, said tappet (19) is rotatable in one direction D and is limitedly rotatable, said upper corner area (19*s*) of each broad side (19-1, 19-4) of said tappet (19) engages said wall elements (18-2, 18-3); and, when said tappet is rotated an angular distance in an opposite direction −D, said beveled areas without said corners (19-2, 19-3) of said tappet (19) move under and past said bevels (18-4, 18-5) of said wall elements (18-2, 18-3) until said tappet engages said bevels, and on continued rotation in direction −D, slides along said bevels, causing said retaining bolt arrangement (6) connected with said tappet (19) to be deflected in direction (R).

\* \* \* \* \*